United States Patent Office 3,554,904
Patented Jan. 12, 1971

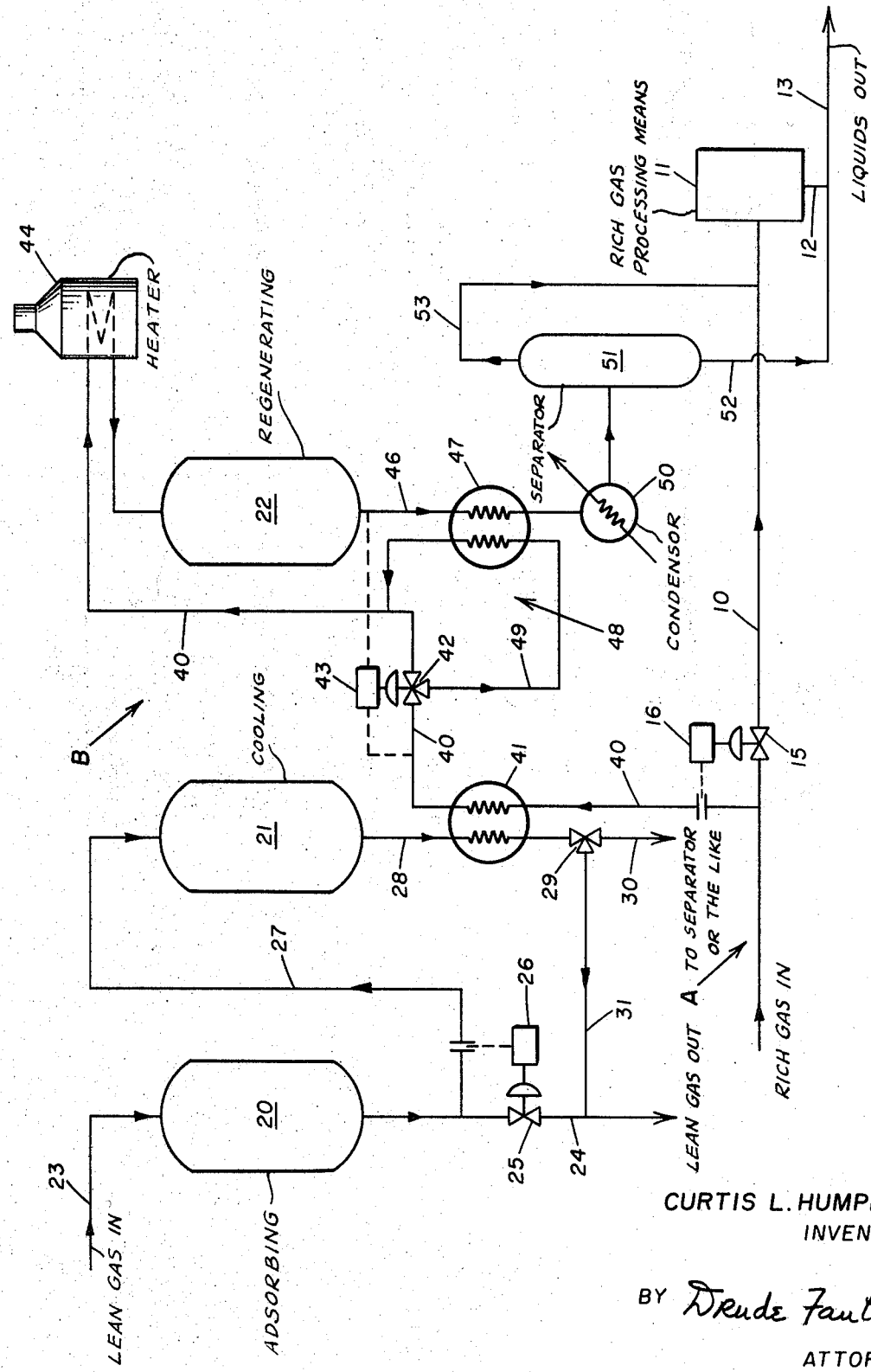

3,554,904
PROCESS AND APPARATUS FOR RECOVERING CONDENSABLE COMPONENTS FROM FLUID STREAMS
Curtis L. Humphries, Duncanville, Tex., assignor to Mobil Oil Corporation, a corporation of New York
Filed Sept. 23, 1968, Ser. No. 761,611
Int. Cl. C10g 5/02
U.S. Cl. 208—340      7 Claims

ABSTRACT OF THE DISCLOSURE

The specification discloses a process and apparatus for recovering condensable, heavier hydrocarbon components, e.g., propane, butane, etc., from natural gas streams wherein at least one of said gas streams originates from a source of gas rich in said hydrocarbon components and at least one of the other gas streams originates from a source of gas lean in said hydrocarbon components. The rich gas is stripped by oil absorption, refrigeration, or other well-known rich gas recovery means. The lean gas is stripped by solid adsorption means which utilizes an open-cycle regeneration system which in turn is supplied with a portion of said rich gas to act as the regenerative gas. The regenerative gas is flowed through a saturated adsorbent bed where it desorbs previously adsorbed heavier hydrocarbons and carries said hydrocarbons to a separator where said heavier hydrocarbons are condensed. The gaseous phase of the regenerative gas plus desorbed heavier components are returned from the separator to the rich gas stream and are stripped therewith in said rich gas recovery means.

BACKGROUND OF THE INVENTION

This invention relates to a process and apparatus for recovering condensable components from fluid streams and, more particularly, relates to a process and apparatus for recovering condensable, heavier hydrocarbons from both rich and lean gas streams.

Natural gas, as it is normally produced from the earth, is basically comprised of methane and ethane but in most instances, heavier, hydrocarbon components, e.g., propane, butane, etc., are also present in said gas. As is well understood in the art, natural gas having a relatively high content of these heavier components is said to be "rich" while natural gas having a relatively low content is said to be "lean." From an economical standpoint, it is usually desirable to recover the heavier components from natural gas prior to its sale.

Different methods of recovering the heavier hydrocarbon components from gas streams are normally employed depending primarily on the richness of the particular gas stream. Where the gas stream is rich, an oil absorption or refrigeration process or a combination of both is generally used. These processes are well known in the art. Although in some instances these processes may also be used to strip lean gas, normally the efficiency of such processes for this purpose is not good. Therefore, the most commonly employed method for stripping lean gas is a solid adsorption process.

A typical solid adsorbing unit of the type used for recovering condensable hydrocarbons from a natural gas stream is comprised of two or three towers, each filled with a solid adsorbent. In operation, a natural gas stream is passed through a first or adsorbing tower where the heavier hydrocarbons from the stream are adsorbed on the adsorbent. The bulk of the stripped gas from the adsorbing tower, now mainly methane, is transferred to a pipeline or storage for sale or other utilization. When the adsorbent in the adsorbing tower becomes saturated, the gas stream is switched to another tower and the first tower is regenerated by passing a stream of heated gas therethrough. This regenerative gas desorbs the heavier components from the adsorbent and carries them to a separator where they are condensed. When most of the heavier components have been desorbed, the flow of regenerative gas is stopped and the first tower is cooled with a portion of the previously mentioned stripped gas to ready the first tower for another adsorbing cycle.

As is well known in the art, continuous operations can be carried out by having the three towers in different cycles at the same time, e.g., the first tower in the adsorbing cycle, the second tower in the regenerative cycle, and the third tower in the cooling cycle. In most units, an automatic switching system is provided so that when the adsorbing tower becomes saturated, the cycles of the towers are switched. That is, the adsorbing tower is switched to regenerating, the cooling tower is switched to adsorbing, and the regenerating tower is switched to cooling. Since the switching operation is automatic, the fluid flow through the unit is without any significant interruption.

A major consideration in operating adsorbing units of the type described involves the composition of the gas used in the regenerative cycle. The regenerative gas stream must be capable of efficiently desorbing the condensable components from the adsorbent but must also be such that said condensable components are readily condensable in a separator or the like after they are removed from the adsorption tower. It can be seen that if the lean gas, such as the stripped natural gas stream, is used, the gas upon desorbing the adsorbed components will have basically the same composition as it had before it was stripped and accordingly the adsorption process will have little utility. Since the condensation efficiencies, with respect to the desorbed components, of the regenerative gas stream are proportional to the content of the heavier components in the regenerative gas stream, it follows that the higher the content of heavier hydrocarbons in the regenerative gas stream, the better the heavier hydrocarbon components will condense in a separator. Thus, by beginning with a gas which is rich in heavier components, the amount of desorbed components from the regenerating tower which is required to saturate the gas to a point where it has high condensation efficiencies is significantly reduced.

Prior adsorption units of the immediate type normally use either a portion of the unstripped main natural gas stream, or the vapors from the liquid product separator, or effluent gas from the tower being cooled as the main source for the regenerative gas and all prove satisfactory in most operations. However, none of these sources always provides as rich a gas as may be desired and in these instances the condensation efficiencies of the regenerative gas have to be improved to increase the overall efficiency of the adsorption process. In other words, the content of heavier hydrocarbon components in the regenerative gas has to be increased in order to increase the efficiency of the process.

In many practical situations, both lean and rich gases are found in the same vicinity. This may result from dually completed wells where gas is produced from different depths or from production of wells in adjacent fields. In such environments, the rich gas is normally stripped with an oil absorption, refrigeration, or combination process, while the lean gas is not stripped at all and is sold as natural gas; or it is inefficiently stripped in an absorption or refrigeration process; or it is stripped with a solid adsorption process usually having a closed-cycle regenerative system. Where an adsorption process with a closed-cycle, regeneration system is used to strip the lean gas, it normally constitutes a separate and distinct process from the oil absorption or refrigeration process used to strip the rich gas and the efficiencies of both processes suffer, as will be explained below.

SUMMARY OF THE INVENTION

In accordance with the present invention, there are provided a new and improved process and apparatus for recovering the condensation, heavier hydrocarbon components, e.g., propane and heavier, from hydrocarbon gas streams which originate from at least two different sources, at least one source supplying gas which is rich in said heavier, hydrocarbon components and at least one other source supplying gas which is lean in said heavier, hydrocarbon components. The present invention utilizes solid adsorption steps and apparatus to strip the gas from the lean gas source and an absorption or refrigerative or a combination step and apparatus to strip the gas from the rich gas source. A portion of the rich gas is used as the regenerative gas in the adsorption steps.

The basic construction and operation of the present invention is as follows. A rich gas stream is flowed through a rich gas supply line and through a heavier, hydrocarbon recovery section such as an oil absorption, refrigeration, or combination recovery means, all of which are known, wherein the heavier, hydrocarbon components are recovered from said rich gas stream. A lean gas stream is flowed through a lean gas supply line and through a solid adsorption section which utilizes at least two towers, each of which is filled with a bed of solid adsorbent.

The lean gas stream is passed through a first or adsorbing tower where the heavier components are adsorbed. The stripped, lean gas is passed from said first tower and is sold as commercial natural gas or otherwise utilized. When the adsorbent bed in the first tower becomes saturated, the lean gas stream is switched to a different tower and the first tower is regenerated. The regeneration of the first tower is accomplished by circulating a portion of rich gas stream from said rich gas supply line through said tower after said portion of rich gas has been adequately heated to the desired regenerative temperature. This heated, regenerative gas passes through the first tower where it desorbs the heavier hydrocarbon components and carries them through a condenser into a separator where said heavier components are condensed as liquid product. The gaseous phase from the separator is normally still relatively rich in uncondensed, heavier hydrocarbon components so this gas is returned to the rich gas supply line and is carried with the rich gas stream through the oil absorption or refrigeration step.

By using the available rich gas as the regenerative gas in the adsorption steps, the efficiency of the adsorption steps is increased due to the high condensation efficiencies of the rich gas. Furthermore, since the gaseous phase from the product separator in the adsorption steps is returned to the rich gas line, the efficiency of the absorption or refrigeration step is also improved since said step is being fed gas which is richer than would normally be supplied thereto.

The actual construction, operation, and the apparent advantages of the invention will be better understood by referring to the drawing in which:

BRIEF DESCRIPTION OF THE DRAWING

The figure is a schematic, flow diagram of apparatus used for recovery of heavy hydrocarbon components in accordance with the present invention.

DESCRIPTION OF THE PREFERRED EMBODIMENT

Referring more particularly to the drawing, there is shown a condensable, heavier hydorcarbon component recovery unit which is capable of carrying out the process of the present invention. The unit is comprised of a rich gas section A and a lean gas section B. The rich gas section A includes a rich gas supply line 10 which is adapted to be connected to a source of rich, natural gas to convey said gas to condensable, heavier hydrocarbon recovery apparatus means 11. Recovery apparatus means 11 can be of the oil absorption type, can be a refrigeration system, can be a combination of the two, or can be any other well-known system commonly used for stripping rich gas. Since such recovery systems are well known in the art and since the construction details of said apparatus means 11 form no part of the present invention, no description of said means is considered necessary. A liquid product line 12 is shown extending from recovery apparatus means 11 for transporting the stripped condensed heavier hydrocarbon liquids from said apparatus means 11 to pipeline 13 which in turn transports said hydrocarbon liquids to a fractionation process or other suitable utilization (not shown).

The lean gas section B is illustrated as being basically comprised of solid adsorbent, condensable hydrocarbon recovery apparatus having at least three towers 20, 21, 22, although it is possible to use only two towers in some instances. These towers are interconnected by the usual conduits and valves which can be cyclically controlled by automatic switching means of any conventional design whereby towers 20, 21, 22 alternately will perform adsorbing, cooling, and regenerating functions. In the interest of preventing the present description from being unduly complex and prolix, the actual "plumbing" details and switching means necessary to switch tower functions have not been illustrated, these features being well within the skill of the art. For the sake of brevity, the solid adsorbent apparatus will be described in an operating condition wherein tower 20 is adsorbing, tower 21 is cooling, and tower 22 is regenerating.

The towers 20, 21, and 22 may be of any suitable construction and are shown to be cylindrical members where their longitudinal axes are vertically positioned. Each of the towers 20, 21, and 22 contains a bed of suitable solid adsorbent which is adapted to separate the condensable hydrocarbon liquids, such as propane, butane, and like heavier components, from the lighter hydrocarbons, such as methane and natural gas. Examples of suitable solid adsorbents are silica gel, activated charcoal, and other solid adsorbents.

Lean gas supply line 23 is adapted to be connected to any source of lean, natural gas to convey said lean gas to tower 20. As the lean gas passes through tower 20, the condensable, heavier hydrocarbon components are adsorbed in tower 20 by the bed of adsorbent contained therein. The stripped, lean gas is removed from tower 20 by conduit 24 and may be sold or transmitted to any other suitable utilization. Valve 25 in conduit 24 is controlled by flow recorder controller 26 to allow a preset portion of the stripped, lean gas stream to flow through line 27, through tower 21, and out line 28 to cool tower 21 which is in a heated condition as a result of prior regeneration. The use of such a stripped, lean gas for cooling purposes is of great advantage in that the solid adsorbent in tower 21 is not excessively presaturated with condensable hydrocarbon components, such as propane and butane, before being subjected to an adsorbing cycle.

At the end of the prior regeneration of tower 21, there is normally left in tower 21 a certain amount of rich regenerative gas containing a quantity of condensable, heavier hydrocarbon components along with some of said components still being desorbed. The lean cooling gas which passes through tower 21 during the first few moments of a cooling function will pick up these remaining condensable hydrocarbon components and carry them from the tower thereby making this exiting cooling gas extremely rich in said components. A three-way valve 29 controlled by an automatic timer (not shown) may be used to divert the initial flow of gas during the first moments of each cooling function into line 30 from which this cooling gas can then be flowed into rich gas supply line 10, into a separator (not shown), or to some other means to recover the condensable heavier hydrocarbon components. After a preset time at the beginning of each cooling function, the timer will actuate valve 29 to direct the flow of cooling gas through line 31 back into line 24 where it can be sold as commercial natural gas or otherwise utilized.

Turning now to the open-cycle regeneration system for the adsorption apparatus, tower 22, previously saturated with condensable, heavier hydrocarbon components while in an adsorbing function, is shown in the regenerating function. A regenerative gas supply line 40 is fluidly connected to rich gas supply line 10 for supplying a portion of the rich, natural gas to the regeneration system to function as the regenerative gas. Valve 15 in rich gas supply line 10 is controlled by flow recorder controller 16 to allow a constant, preset flow rate of rich gas to flow through the regeneration system. By using the rich natural gas as the regenerative gas, the efficiency of the adsorption recovery is increased due to the high condensation efficiencies of the rich gas.

The rich gas in regenerative supply line 40 is passed through indirect heat exchange 41 where heat from the cooling gas in line 28 is transferred to the regenerative gas. The rich, regenerative gas flows from the heat exchanger, through motor operated, three-way valve 42 (the purpose of which will be explained below) into heater 44 where the gas is heated to suitable regenerative temperatures, e.g., 500° F. The heated gas passes from heater 44 and flows through regenerating tower 22. As the regenerative gas passes through tower 22, the heavier hydrocarbon components in tower 22 are desorbed and carried out of tower 22 by said gas into outlet line 46.

The regenerative gas plus desorbed components in line 46 pass through indirect heat exchanger 47 wherein heat from said regenerative gas in line 46 is transferred to the regenerative gas in heat utilization loop 48. Loop 48 comprises line 49 which communicates with three-way valve 42 which in turn is controlled by temperature controller 43 which actuates valve 42 to divert flow of the rich gas in line 40 through loop 48 whenever the gas in outlet 46 is hotter than the gas in line 40. By transferring heat from line 46 to line 40, the heat exchange serves two purposes. First, the gas in line 40 is preheated prior to passing through heater 44 and second, the gas in line 46 is cooled prior to passing through condenser 50.

The regenerative gas passes from condenser 50 where it is cooled into separator 51 where most of the heavier hydrocarbon components condense into liquid product. The liquid product is removed from separator 51 by line 52 which can directly lead to a fractionation process or other utilization, or it can join line 13 to combine liquid product from the adsorption apparatus with that from recovery apparatus means 11.

The gaseous or vapor phase of the regenerative gas is removed from separator 51 by line 53. Since this vapor phase is normally still very rich in heavier hydrocarbon components, it is returned to rich gas supply line 10 so it can flow with said rich gas through the recovery apparatus means 11 where substantially all of the heavier hydrocarbon components will be recovered.

In some situations, the pressures in the lean gas supply line 23 and rich gas supply line 10 may vary substantially. In this event, a tower which has just undergone a function involving the higher pressure gas may have to be bled to reduce the pressure therein prior to opening said tower to the lower pressure gas in order to prevent blowback of adsorbent and the like. Other means, such as pressure regulators or check valves, can be used to equalize the pressures in the two supply lines depending on a particular situation and would be readily suggested to one skilled in the art.

Although a particular embodiment has been illustrated and described, it will be understood by those skilled in the art that various changes or modifications may be made thereto without departure from the spirit and scope of the invention as encompassed by the following claims.

What is claimed is:

1. The process of recovering condensable, heavier hydrocarbon components from hydrocarbon gas streams wherein at least one of said streams originates from a natural source of gas rich in said condensable, heavier hydrocarbon components and at least one of the other of said gas streams originates from a natural source of gas lean in said condensable, heavier hydrocarbon components comprising:

flowing at least one main, said rich gas stream through a heavier hydrocarbon components recovery means to recover said components from said rich gas stream;

flowing at least one main, said lean gas stream through a first bed of solid adsorbent to adsorb said condensable, heavier hydrocarbon components from said main, lean gas stream and removing the stripped, main, lean gas stream from said first bed;

switching said at least one main, said lean gas stream to a second bed of solid adsorbent when said first bed of adsorbent becomes substantially saturated with said condensable, heavier hydrocarbon components;

flowing a portion of said at least one main, rich gas stream, prior to said main, rich gas stream flowing through said hydrocarbon recovery means, through a heating means to heat said portion to a regenerating temperature;

flowing said heated portion of said at least one main, rich gas stream through said first bed of adsorbent to desorb said condensable, heavier hydrocarbon components;

removing said heated portion of said at least one main, rich gas stream plus said desorbed heavier hydrocarbon components from said first bed of adsorbent; and condensing said condensable, heavier hydrocarbon components in said portion of said at least one main, rich gas stream plus said desorbed, heavier hydrocarbon components.

2. The process of claim 1 including:

returning said portion of said at least one main, rich gas stream plus desorbed heavier hydrocarbon components which remain in gaseous phase after condensing said condensable, heavier hydrocarbon components to said at least one main, rich gas stream prior to said main, rich gas stream flowing through said heavier hydrocarbon components recovery means.

3. The process of claim 1 wherein:

said heavier hydrocarbon components recovery means comprises an oil absorption means.

4. The process of claim 1 wherein:

said heavier hydrocarbon components recovery means comprises a refrigeration means.

5. The process of claim 1 including the step of:

indirectly heat exchanging said portion of said at least one main, rich gas stream plus desorbed components after they are removed from said first bed of adsorbent with said portion of said at least one main, rich gas stream prior to heating the latter.

6. Apparatus for recovering condensable, heavier hydrocarbon components from hydrocarbon gas streams which originate from at least two different sources, at least one natural source supplying gas which is rich in said heavier hydrocarbon components and at least one other natural source supplying gas which is lean in said heavier hydrocarbon components, said apparatus comprising:

a heavier hydrocarbon recovery means for condensing condensable heavier hydrocarbon components from said rich gas;

rich gas supply means adapted to be connected to said source of rich gas to supply a main, rich gas stream to said heavier hydrocarbon recovery means;

means to remove the condensed heavier hydrocarbon from said recovery means;
a first bed of adsorbent;
lean gas supply means adapted to be connected to said source of lean gas to supply a main, lean gas stream to said first bed of adsorbent;
means for removing said main, lean gas stream from said first bed of adsorbent after said condensable, heavier hydrocarbons are adsorbed in said first bed; and
an open-cycle generation system comprising:
a heating means;
means connected to said rich gas supply means upstream of said heavier hydrocarbon recovery means to supply rich gas to said heating means;
means connected to said heating means to supply heated, rich gas to said first bed of adsorbent when said bed becomes substantially saturated with said condensable, heavier hydrocarbon components;
means for removing said heated, rich gas plus desorbed heavier hydrocarbon components from said first bed of adsorbent;
separating means adapted to receive said rich gas plus desorbed components from said bed to condense said condensable, heavier hydrocarbon components therefrom; and
means to remove said condensed heavier hydrocarbon components from said separating means.

7. The apparatus of claim 6 including:
means for returning the gaseous phase of said rich gas plus desorbed components from said separating means to said rich gas supply means.

References Cited
UNITED STATES PATENTS

| | | | |
|---|---|---|---|
| 3,007,543 | 9/1968 | Maher | 62—18 |
| 3,137,549 | 6/1964 | Kilgore et al. | 55—33 |
| 3,288,705 | 11/1966 | Humphries | 208—310 |
| 3,324,669 | 6/1967 | Cooper et al. | 62—18 |

HERBERT LEVINE, Primary Examiner

U.S. Cl. X.R.

55—62; 62—18, 23